United States Patent [19]

Matsuda

[11] Patent Number: 5,113,504
[45] Date of Patent: May 12, 1992

[54] MONITORING APPARATUS FOR CONTROL SYSTEM WITH MICROCOMPUTER

[75] Inventor: Toshiro Matsuda, Zama, Japan

[73] Assignee: Nissan Motor Company, Limited, Yokohama, Japan

[21] Appl. No.: 334,804

[22] Filed: Apr. 7, 1989

Related U.S. Application Data

[63] Continuation of Ser. No. 40,721, Apr. 20, 1987, abandoned, which is a continuation of Ser. No. 485,019, Apr. 14, 1983, abandoned.

[30] Foreign Application Priority Data

May 19, 1982 [JP] Japan ................................ 57-83232

[51] Int. Cl.$^5$ ............................................. G06F 11/28
[52] U.S. Cl. ........................................ 395/575; 371/12; 371/62
[58] Field of Search ..................... 371/12, 14, 61, 62, 371/65; 364/200, 900

[56] References Cited

U.S. PATENT DOCUMENTS

| | | | |
|---|---|---|---|
| 3,470,538 | 9/1969 | Harbaugh | 364/200 |
| 4,040,022 | 8/1977 | Takii | 364/900 |
| 4,072,852 | 2/1978 | Hogan et al. | 364/900 X |
| 4,162,526 | 7/1979 | Gass et al. | 364/200 |
| 4,282,574 | 8/1981 | Yoshida et al. | 371/12 X |
| 4,317,167 | 2/1982 | Hartig et al. | 371/62 X |
| 4,355,359 | 10/1982 | Kanegae et al. | 371/62 X |
| 4,363,092 | 12/1982 | Abo et al. | |
| 4,399,537 | 8/1983 | Jones | 371/62 X |
| 4,410,991 | 10/1983 | Lenart | 371/12 X |
| 4,414,623 | 11/1983 | Davis et al. | 364/200 |
| 4,488,303 | 11/1984 | Abramovich | 371/12 X |

FOREIGN PATENT DOCUMENTS

| | | |
|---|---|---|
| 0008041 | 9/1983 | European Pat. Off. |
| 2332458 | 6/1977 | Fed. Rep. of Germany |
| 2729408 | of 1979 | Fed. Rep. of Germany |
| 2842392 | 4/1980 | Fed. Rep. of Germany |
| 52-49742 | 4/1977 | Japan .................................... 371/61 |
| 1475416 | 6/1974 | United Kingdom |
| 1523691 | 4/1976 | United Kingdom |
| 2035633 | 6/1980 | United Kingdom |

OTHER PUBLICATIONS

BBC Publication No. DVK 123081D, "BBC-Elektronik Baureihe IC-V", part 3, issue Apr. 1981.
BBC-Publication DVK 131982 D, "Schiffsautomation MICAS, Automatische Fehlererkennung bei Mikrocomputern", (special print from BBC-Nachridten Oct. 1982, annual set 63, pp. 343-352).

Primary Examiner—David L. Clark
Attorney, Agent, or Firm—Foley & Lardner

[57] ABSTRACT

A monitoring apparatus for a control system including a microcomputer which can output a microcomputer reset signal only once or repeatedly if a program run pulse signal outputted from the microcomputer stops oscillating for longer than a first predetermined time interval $T_1$ and an additional trouble detection command signal if the program run pulse signal stops oscillating for longer than a second predetermined time interval $T_2$ which is longer than time interval $T_1$. In response to this trouble detection command signal, an alarm lamp is lit up and/or the control system is disabled.

2 Claims, 6 Drawing Sheets

MONITORING APPARATUS FOR CONTROL SYSTEM WITH MICROCOMPUTER

This application is a continuation of application Ser. No. 07/040,721, filed Apr. 20, 1987, now abandoned; which is a continuation of application Ser. No. 06/485,019, filed Apr. 14, 1983, now abandoned.

BACKGROUND OF THE INVENTION

1. Field of the Invention

The present invention relates generally to a monitoring apparatus for a control system provided with a microcomputer and more specifically to a monitoring apparatus which can detect trouble within a microcomputer provided for a control system and can output a trouble detection command signal in case of trouble.

2. Description of the Prior Art

Recently, microcomputers have been widely used in various fields for controlling various operations. The microcomputer encapsulated within a chip (so-called microprocessor) is usually provided with a microprocessing unit (MPU) for executing various calculations or operations in accordance with control programs (software), a random-access memory (RAM) for temporarily storing various data, a read-only memory (ROM) for storing control programs, and input/output ports.

However, since trouble sometimes occurs in even a microcomputer, it is very important to monitor the operation of the microcomputer at all times and to inform the user of abnormal operations in case of trouble.

In particular, in the case of a microcomputer used for controlling a brake system an automotive vehicle, for instance, since malfunction or misoperation of the brake system caused by microcomputer trouble may readily result in a seriously-dangerous situation, it is indispensable to provide an appropriate monitoring system for a vehicle control system provided with a microcomputer.

Microcomputer troubles can be divided into roughly two groups, that is, software trouble and hardware trouble. Causes of software trouble include, for example, destruction of input data due to mixture of external noise and consequent temporary stoppage of program execution or temporary formation of an abnormal program loop without executing normal program control. On the other hand, the causes of hardware trouble, include, for example, stoppage of a clock pulse oscillator with the result that all the operations of the microcomputer stop completely.

A microcomputer monitoring method is known including the steps of: (1) outputting a program run pulse signal with a predetermined period (hereinafter referred to simply as a PR signal) from a microcomputer whenever program control is executed normally; (2) applying this PR signal to a timer circuit for monitoring the period of the PR signal; and (3) outputting a reset signal from the timer circuit to the microcomputer when the period of the PR signal exceeds a predetermined time interval thereby indicating abnormal program control, in order to compulsorily restart the program control again beginning from the start step. In this method the PR signal is periodically inverted in response to a command signal outputted in accordance with a monitoring program incorporated at the end step of the control program.

In the above-mentioned monitoring method, temporary microcomputer trouble due to, for instance, mixture of external noise can be corrected reliably. However, in a case where computer trouble due to, for instance, defective hardware occurs, even if the microcomputer is reset repeatedly, the microcomputer will not operate normally.

As already described hereinabove, in the case where a microcomputer is provided for a control system which may result in a dangerous situation in case of trouble, it is quite important to inform the user of the microcomputer trouble and further to implement fail-safe operation or to disable to control system where necessary.

A more detailed description of the prior-art monitoring apparatus for a control system provided with a microcomputer will be made with reference to the attached drawings under DETAILED DESCRIPTION OF THE PREFERRED EMBODIMENTS.

SUMMARY OF THE INVENTION

With these problems in mind, it is the primary object of the present invention to provide a monitoring apparatus for a control system provided with a microcomputer which can output a trouble detection command signal, in order to produce an alarm and/or to disable the control system, if the program run pulse signal stops oscillating longer than a predetermined time interval in spite of the fact that the microcomputer has been reset only once or repeatedly.

This and other objects of the invention are achieved according to the present invention by providing a monitoring apparatus for a control system incorporating a microcomputer comprising: a first timer responsive to the microcomputer for outputting a reset signal to the microcomputer when a program run pulse signal PR (PR signal) stops oscillating for longer than a first time interval $T_1$ determined by the first timer, and a second timer also responsive to the microcomputer for outputting a trouble detection command signal when the program run pulse signal stops oscillating for longer than a second time interval $T_2$ determined by the second timer, the second time interval being longer than the first time interval $(T_2 > T_1)$. In response to the abovementioned trouble detection command signal, an alarm lamp and/or a control-system disabling means are activated.

Further, by additionally providing an oscillator and a third timer, it is possible to reset the microcomputer repeatedly before the above-mentioned trouble detection command signal is outputted from the monitoring apparatus according to the present invention.

BRIEF DESCRIPTION OF THE DRAWINGS

The features and advantages of a monitoring apparatus for a control system provided with a microcomputer according to the present invention over the prior-art monitoring apparatus will be more clearly appreciated from the following description of preferred embodiments of the invention taken in conjunction with the accompanying drawings in which like reference numerals or reference labels designate the same or similar elements or sections throughout the figures thereof and in which.

DETAILED DESCRIPTION OF THE PREFERRED EMBODIMENTS

To facilitate understanding of the present invention, a brief reference will be made to a prior-art monitoring apparatus for a microcomputer or microprocessor.

Figure 1:
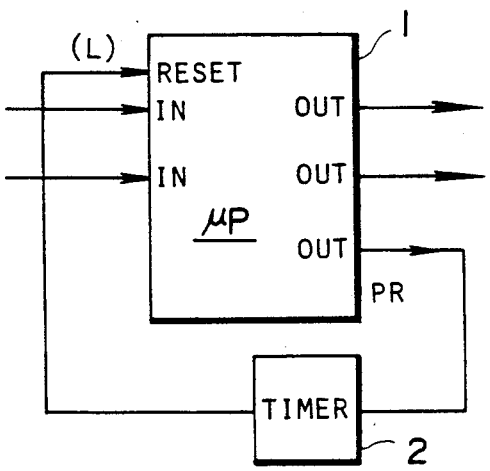
FIG. 1 is a schematic block diagram of an example of a prior-art monitoring apparatus for a microcomputer.

With reference to FIG. 1, the reference numeral 1 denotes a microcomputer or a microprocessor encapsulated within a chip including a microprocessing unit, a random-access memory, a read-only memory, and input/output ports. The reference numeral 2 denotes a timer circuit made up of a retriggerable monostable multivibrator.

Figure 2:
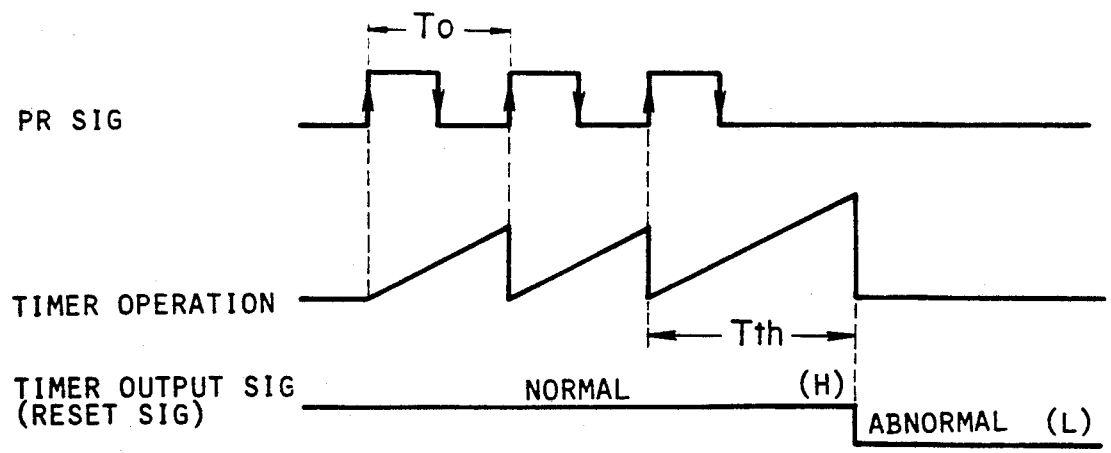
FIG. 2 is a timing chart for assistance in explaining the operation of the prior-art monitoring apparatus for a microcomputer shown in FIG. 1.
Figure 3:
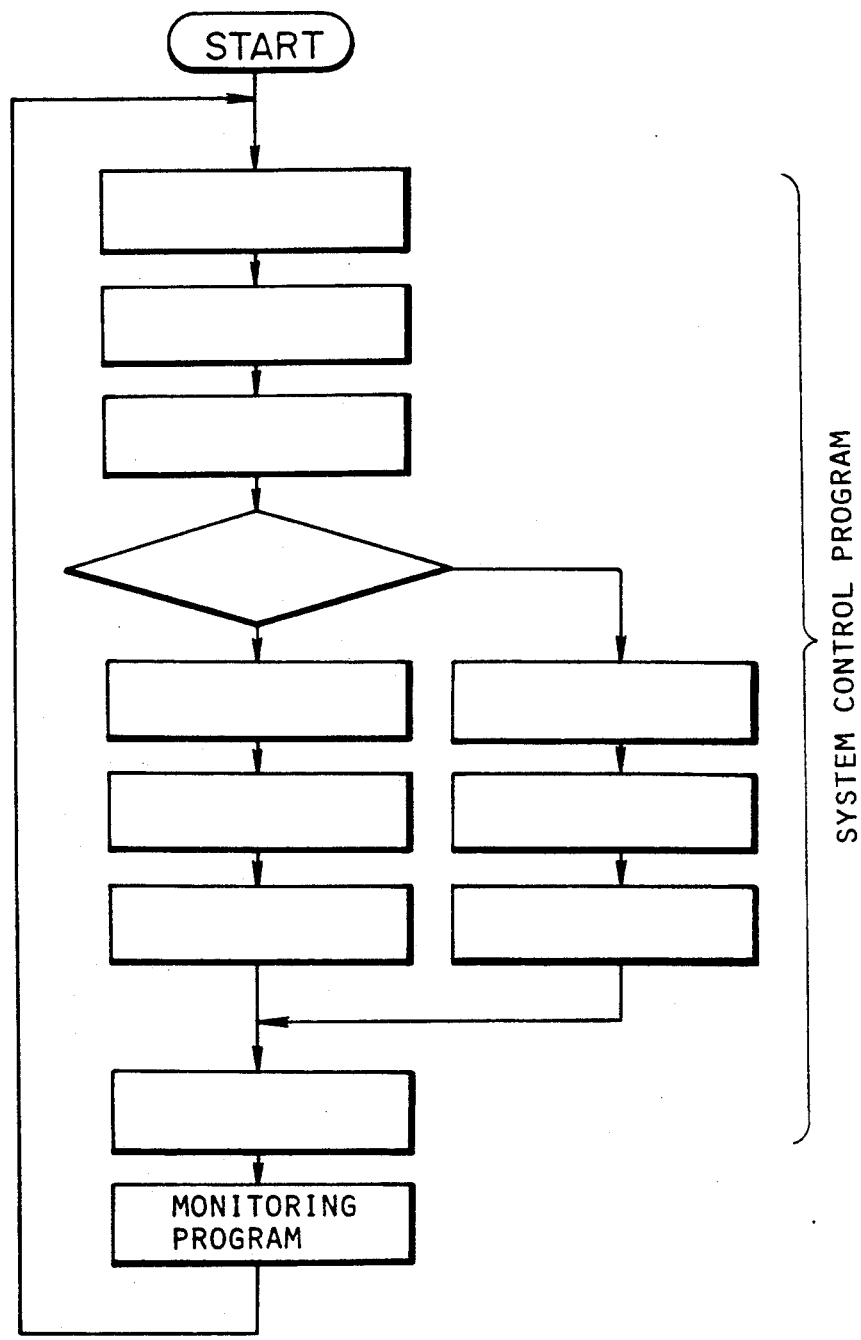
FIG. 3 is an example of a prior-art flowchart including a microcomputer monitoring program stored in a microcomputer for generating a program run pulse signal (PR signal)

In FIG. 1, the label PR designates a program run pulse signal (PR signal), the voltage level of which is periodically inverted with a period of $T_o$, as shown in FIG. 2, so long as control programs stored within the microprocessor 1 are executed normally one by one. However, in case data inputted to the microprocessor 1 is destroyed due to mixture of external noise and therefore program execution is interrupted or an abnormal program execution loop is formed, this PR signal is held at an L-voltage level, for instance. In this connection, the voltage level of the PR signal is inverted periodically in response to a command signal outputted in accordance with a monitoring program. This monitoring program is usually incorporated at the end of the processing steps of a program control, as depicted in FIG. 3, by way of example.

The timer circuit 2 is a retriggerable monostable multivibrator. As is well known, a monostable multivibrator is a circuit as follows: one of two output terminals thereof is kept at an L-voltage level, for instance, and the other of two output terminals thereof is kept at an H-voltage level; when an input terminal thereof is triggered, the voltage level of each output terminal is inverted for a predetermined time interval determined in accordance with a time constant obtained by a pair of a capacitor and a resistor, and then is returned to the original state. As is well known, a retriggerable monostable multivibrator is a circuit as follows: so long as the input terminal thereof is triggered periodically within a predetermined time interval determined by the time constant, one of two output terminals thereof is kept at an H-voltage level, for instance, and the other of the two output terminals thereof is kept at an L-voltage level; when the input terminal thereof is not triggered within the predetermined time interval, the voltage level of each output terminal is inverted, returning to the original state (one: L-level; the other: H-level).

The operation of the prior-art monitoring apparatus will now be described with reference to FIG. 2. When control programs are executed normally, since the PR signal is inverted periodically with a period $T_o$, the leading edge thereof periodically triggers the timer circuit 2, so that the output terminal of the timer circuit 2 is kept at an H-voltage level without resetting the microprocessor 1. In contrast with this, in case external noise, for instance, is inputted to the microprocessor 1 and therefore the input data is destroyed, since program control is interrupted or an abnormal program execution loop is formed without executing the program control normally, the monitoring program is not executed so that no command signal is outputted to invert the PR signal. Therefore, when the period of this PR signal exceeds a predetermined threshold time interval $T_{th}$, the retriggerable monostable timer circuit 2 is returned to the original state, changing the output terminal thereof to an L-voltage level in order to reset the microprocessor 1. When reset, the microprocessor begins to execute the control program again beginning from the start, thus preventing a temporary erroneous operation within the microprocessor 1.

The above-mentioned prior-art monitoring apparatus can reliably prevent microprocessor misoperation due to software trouble; however, in case of certain hardware troubles (e.g. the clock pulse generator will not operate), the microprocessor 1 is never returned to the normal condition, but stops completely, even if reset repeatedly.

In view of the above description, reference is now made to preferred embodiments of the monitoring apparatus for a control system including a microcomputer according to the present invention. Further, an anti-skid control system for an automotive vehicle is described as an example of an important control system including a microcomputer.

The anti-skid control system serves to prevent an automotive vehicle from slipping sideways on the road with the wheels locked while the vehicle moves onward. In an emergency, when the brakes are strongly applied to an automotive vehicle and thereby the rear wheels are locked, the vehicle tends to skid. Skidding can be prevented by reducing the hydraulic pressure of brake fluid immediately before the wheels are locked. However, if the hydraulic pressure is left reduced, no brake force is applied to the vehicle even if the brake pedal is fully depressed. The anti-skid control system can control the hydraulic pressure of the brake fluid so as to obtain an appropriate brake function without the vehicle skidding sideways by repeatedly increasing or reducing the hydraulic pressure depending on the speed of revolution of the vehicle wheels.

In such an anti-skid control system as described above, however, once trouble occurs within the microcomputer, it is impossible to control the hydraulic pressure so as to obtain maximum brake efficiency even if various command signals obtained according to the degree of brake pedal depression are applied to the microcomputer. In particular, if a command signal to reduce the brake hydraulic pressure continues to be outputted from the microcomputer due to microcomputer trouble, there is a danger that the braking distance may be increased.

Figure 4:
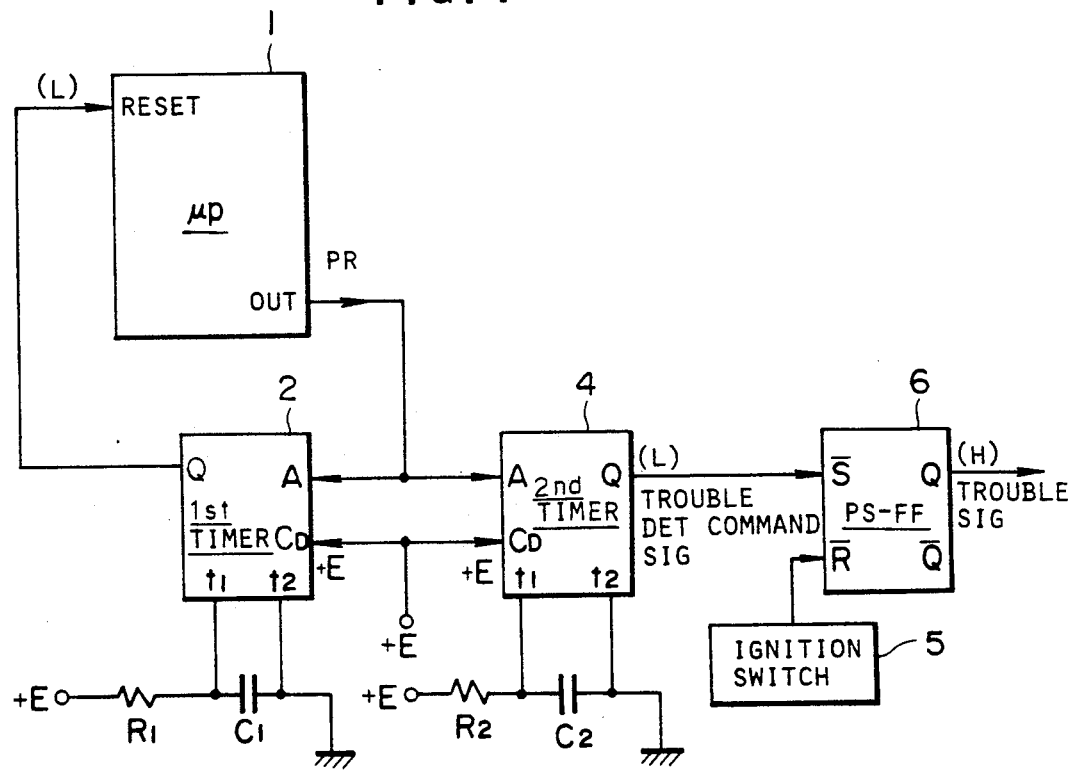
FIG. 4 is a schematic block diagram of a first embodiment of monitoring apparatus for a control system provided with a microcomputer according to the present invention.

FIG. 4 shows a schematic block diagram of a first embodiment according to the present invention. A microprocessor 1 is provided with a program for controlling, for instance, an anti-skid control system. The microprocessor 1 outputs a program run pulse signal (PR signal) oscillating with a period of $T_o$ from the OUT terminal so long as the program is executed normally. This microprocessor 1 can be reset when an L-voltage level signal is applied to the RESET terminal thereof. When reset, the microprocessor 1 begins again to execute the control program from the start. As the microprocessor 1, it is possible to use a HITACHI model MP HD 6801, for instance.

A first timer 2 is provided comprising a retriggerable monostable multivibrator. The PR signal is applied to the input terminal A of timer 2. A pair of resistor $R_1$ and capacitor $C_1$ are externally connected to the two terminals $t_1$ and $t_2$ of the first timer 2 for determining a first fixed inversion time interval $T_1$. Therefore, with reference to FIG. 5, when the PR signal rises to an H-voltage level within the first inversion time period $T_1$, the first timer 2 is repeatedly triggered to set the timer, that is, to keep the output Q thereof at an H-voltage level continuously. However, when the PR signal is left at an H- or an L-voltage level for more than the first fixed inversion time interval $T_1$, the first timer 2 outputs an L-voltage level signal from the terminal Q thereof to reset the microprocessor 1. Suitable retriggerable monostable multivibrator for use as timer 2 are well known. For example, it is possible to use a HITACHI model HD 14538B. The label $C_D$ in the timer 2 denotes a terminal to which a power supply is connected.

In addition to the first timer 2, a second timer 4 and a reset-set flip-flop (RS-FF) 6 are incorporated in the first embodiment according to the present invention. The second timer 4 is also a retriggerable monostable multivibrator the same as first timer 2. Timer 4 serves as a trouble detection command signal generating means. The PR signal is similarly applied to the input terminal A of the second timer 4. Another resistor $R_2$ and another capacitor $C_2$ are externally connected to the two terminals $t_1$ and $t_2$ of timer 4 for determining a second fixed inversion time interval $T_2$, which is longer than $T_1$ by at least a time interval $\Delta T$ corresponding to the interval between the time the microprocessor 1 is reset and the time the PR signal begins to oscillate again. Similarly to the first timer 2, when the PR signal rises to a H-voltage level within the second inversion time interval $T_2$, the second timer 4 is repeatedly triggered to set it, that is, to keep the output Q thereof continuously at an H-voltage level. However, when the PR signal is left at an H- or an L-voltage level for more than the second inversion time interval $T_2$, the second timer 4 outputs an L-voltage level signal from the terminal Q thereof as a trouble detection command signal.

The reset-set flip-flop (RS-FF) 6 is a bistable multivibrator which serves as a trouble signal outputting means, the output terminal Q of which is set to an H-voltage level when the signal applied to the inversion set terminal $\bar{S}$ drops to an L-voltage level, and reset to an L-voltage level when the signal applied to the inversion reset terminal e,ovs/R/ drops to a L-voltage level.

It is preferable to reset this RS-FF 6 whenever the control system including a microcomputer is activated or whenever a power supply voltage is applied to the control system. It is also possible to reset this RS-FF 6 whenever an ignition switch is turned on in the case of a control system used for an automotive vehicle.

Figure 5:
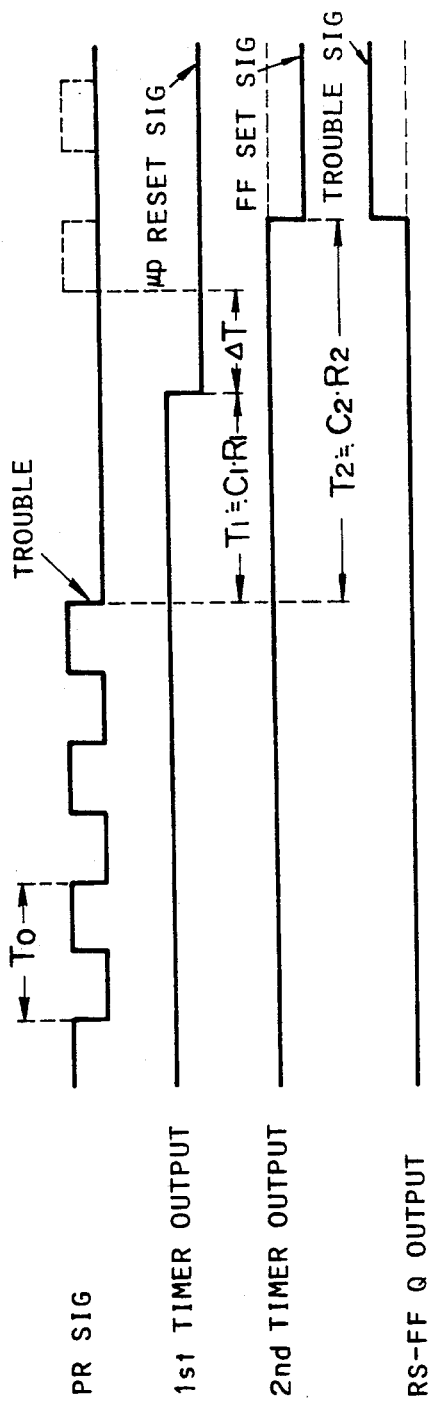
FIG. 5 is a timing chart for assistance in explaining the operation of the first embodiment of the monitoring apparatus for a control system provided with a microcomputer according to the present invention shown in FIG. 4.

The operation of the embodiment shown in FIG. 4 will now be described with reference to the time chart shown in FIG. 5.

If the microprocessor 1 executes control programs normally, the PR signal occurs with almost a constant period $T_o$, and this period $T_o$ is shorter than the first inversion time interval $T_1$. Thus, the first timer 2 is repeatedly triggered to hold the terminal Q thereof at an H-voltage level without resetting the microprocessor 1. In this case, since the period $T_o$ is, of course, shorter than the second inversion time interval $T_2$, the second timer 4 is also triggered repeatedly to hold the terminal Q thereof at an H-voltage level (no trouble detection command signal), without setting the RS-FF 6. Therefore, the RS-FF 6 is kept reset to hold the output Q thereof at an L-voltage level, without outputting an H-voltage level trouble signal.

If temporary software trouble occurs within the microprocessor 1, since the PR signal stops oscillating for a time exceeding the first inversion time interval $T_1$, the first timer 2 is inverted to change the terminal Q thereof to an L-voltage level to reset the microprocessor 1. Therefore, the program is returned to the start step for executing the program control again. When the program control is then executed normally, since the PR signal normally begins oscillating with a period of $T_o$, the first timer 2 is repeatedly triggered again to hold the terminal thereof at a H-voltage level without further resetting the microprocessor 1. In this case, the RS-FF 6 is also kept reset to hold the output Q thereof at a L-voltage level in response to the H-voltage level signal from the second timer 4, without outputting an H-voltage level trouble signal.

If hardware trouble occurs within the microcomputer 1 and the operation thereof stops completely, since the PR signal stops oscillating, the first timer 2 is inverted to change the terminal Q thereof to an L-voltage level to reset the microprocessor 1. However, since the microprocessor 1 is not returned to a normal condition so that no PR signal is outputted, oscillation-stop time elapses exceeding the second inversion time interval $T_2$ preset in the second timer 4. Therefore, the second timer 4 is also reset to output an L-voltage level signal from the terminal Q thereof to the inversion set terminal $\bar{S}$ of the RS-FF 6. As a result, the output terminal Q of the RS-FF 6 is set to output an H-voltage level trouble signal. This trouble signal (H-voltage level) is used to light up an alarm lamp or to disconnect or disable the control system (to perform fail-safe operation), as described hereinbelow.

Figure 6:
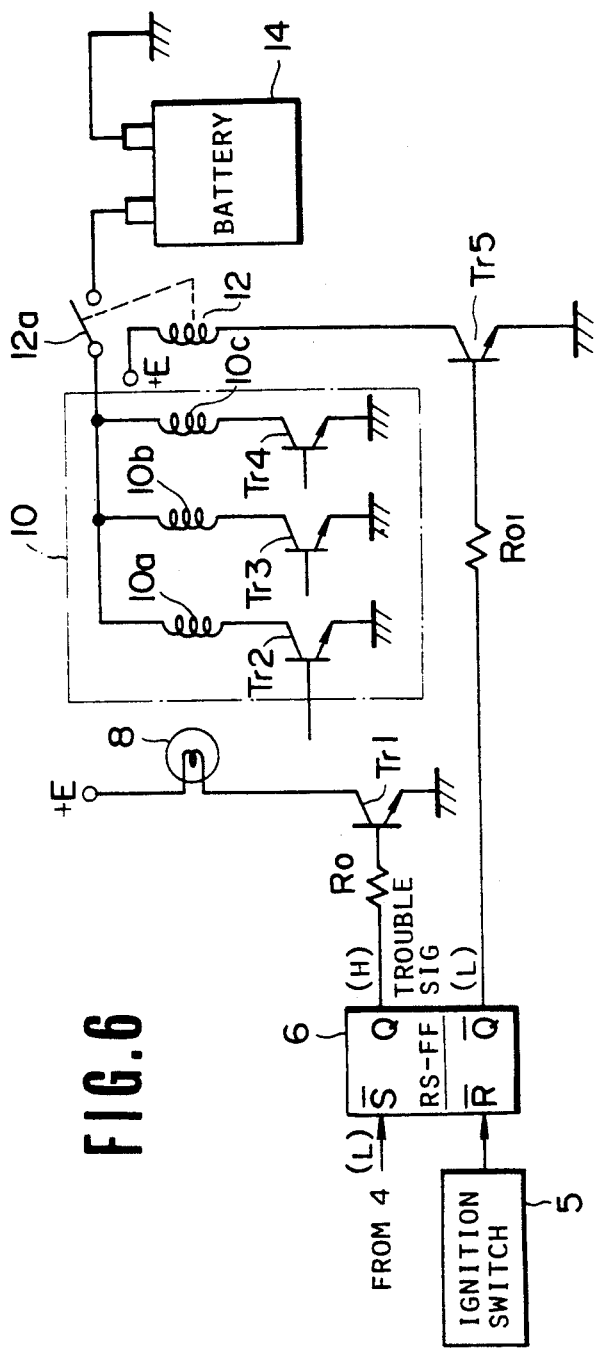
FIG. 6 is a schematic block diagram of an exemplary alarm generating circuit and a control system disabling circuit used for an anti-skid control system for an automotive vehicle, which is activated in response to a trouble signal outputted from the monitoring apparatus according to the present invention shown in FIG. 4.

FIG. 6 shows a schematic block diagram of an exemplary alarm and control-system disabling circuit activated in response to the trouble signal from the RS-FF 6. In FIG. 6, the reference numeral 8 denotes an alarm lamp; the reference numeral 10 denotes an actuator used for an anti-skid control system; the reference numeral 12 denotes an electromagnetic relay, and the reference numeral 14 denotes a battery.

The anti-skid control system actuator 10 includes a plurality of transistors $Tr_2$, $Tr_3$ and $Tr_4$ which are turned on or off in response to a plurality of hydraulic pressure control signals outputted from a known type of anti-skid control system (not shown), and a plurality of electromagnetic solenoids 10a, 10b and 10c each connected to a collector of one of the transistors $Tr_2$, $Tr_3$ or $Tr_4$, respectively, for increasing or decreasing the hydraulic pressure of the automotive vehicle brake system when each of the corresponding transistors is turned on or off.

The output terminal Q of the RS-FF 6 is connected to the base of a transistor $Tr_1$ through a resistor $R_o$ and the alarm lamp 8 is connected to the collector of the transistor $Tr_1$. On the other hand, the inversion output terminal $\overline{Q}$ of the RS-FF 6 is connected to the base of a transistor $Tr_5$ through a resistor $R_{01}$ and the system-disabling electromagnetic relay 12 is connected to the collector of the transistor $Tr_5$. Further, a relay contact 12a of the electromagnetic relay 12 is connected midway between the actuator 10 and the battery 14. Therefore, when the transistor $Tr_5$ is turned on, the relay 12 is energized to close the relay contact 12a, so that the actuator 10 is activated; however, when $Tr_5$ is off, the actuator 10 is disabled, because the battery 14 is cut off from the actuator 10.

The operation of the alarm and control-system disabling circuit shown in FIG. 6 will now be described. If the monitoring apparatus shown in FIG. 5 outputs an H-voltage level trouble signal from the output terminal Q of the RS-FF 6, the transistor $Tr_1$ is turned on to light up the alarm lamp 8 indicating that trouble exists in the control system including microprocessor 1. Additionally, since another trouble signal having an L-voltage level is outputted from the inversion output terminal $\overline{Q}$ of the RS-FF 6, the transistor $Tr_5$ is turned off to deenergize the system-disabling relay 12, so that the relay contact 12a is opened. Therefore, the power supply is cut off from the actuator 10 to disable the actuator 10, that is, the electromagnetic solenoids 10a, 10b and 10c. As a result the anti-skid control system is disconnected and the brake system is automatically returned to normal brake operation.

As described above, in the monitoring apparatus of a control system including a microcomputer according to the present invention, in case trouble occurs in the microprocessor, since the occurrence of trouble is indicated to the driver by an alarm lamp and further since the actuator of the anti-skid control system is disabled returning the brake system to ordinary brake operation (fail-safe operation is achieved), it is possible to drive the vehicle safely without dangerously increasing braking distance.

Figure 7:
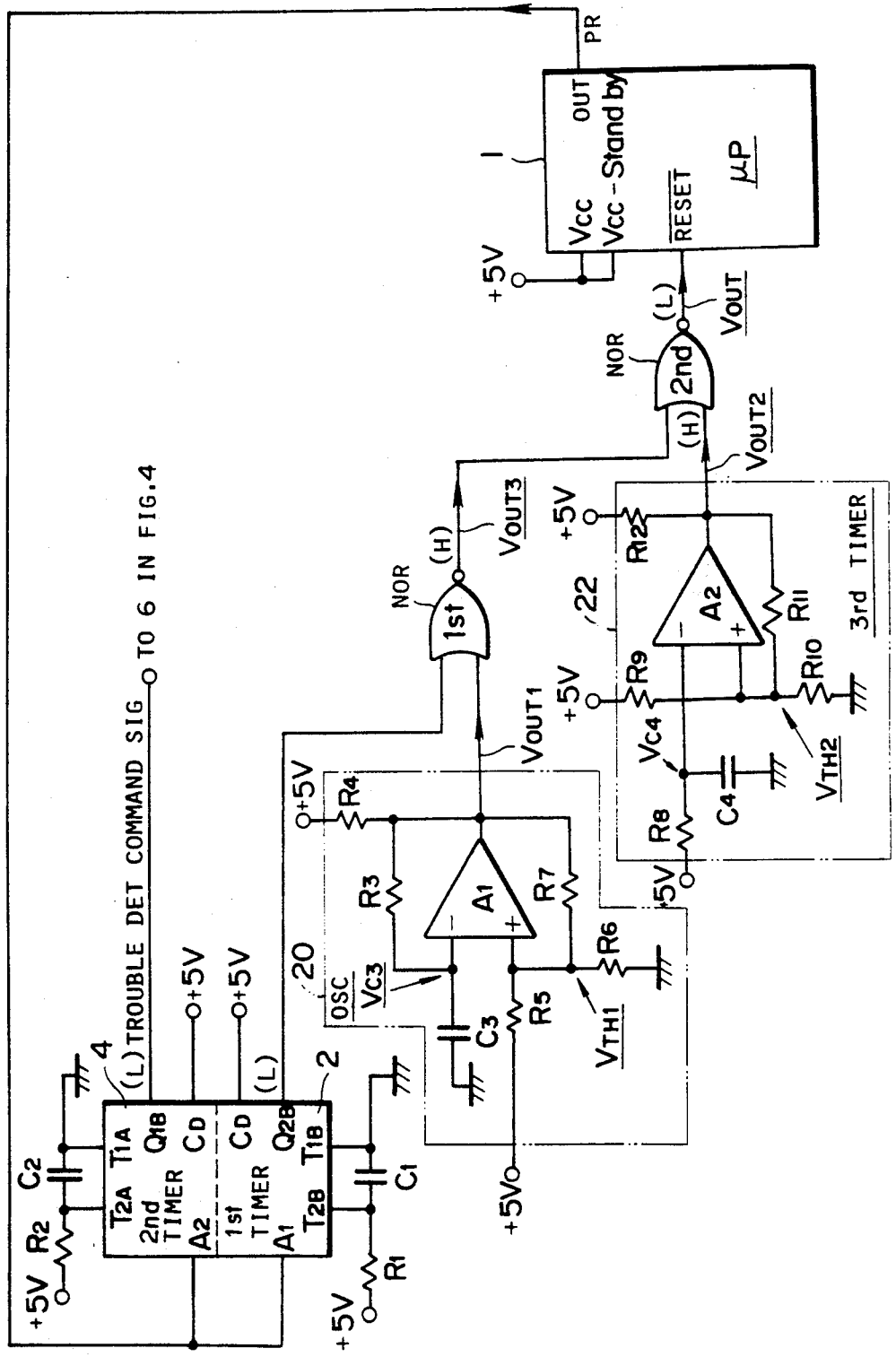
FIG. 7 is a schematic block diagram of a second embodiment of monitoring apparatus for a control system provided with a microcomputer according to the present invention, in which the microcomputer is repeatedly reset before the trouble detection command signal is outputted.

FIG. 7 shows a schematic block diagram of a second embodiment of the monitoring apparatus for a control system including a microcomputer according to the present invention. In this embodiment, an oscillator 20, a third timer 22 and two NOR gates are incorporated between the output terminal $Q_{2B}$ of the first timer 2 and the reset terminal $\overline{RESET}$ of the microprocessor 1, in addition to the features of the first embodiment shown in FIG. 4.

The oscillator 20 serves to reset the microprocessor 1 repeatedly if the microprocessor stops generating the PR signal. The third timer 22 serves to reset the microprocessor 1 initially only once when a power supply is turned on. Further, in the same way as in the first embodiment, the second timer 4 outputs a trouble detection command signal if the microprocessor will not generate the PR signal normally after the microprocessor has been reset repeatedly.

As the microprocessor 1, it is possible to use HITACHI model MP HD 6801, for instance. As the first and second timers 2 and 4, it is possible to use HITACHI retriggerable monostable multivibrators model HD 14538 B.

The operation of the microprocessor 1 and two timers 2 and 4 has already been explained in the description of the first embodiment and will not be repeated.

The oscillator 20 comprises an operational amplifier $A_1$ which serves as a comparator. The operational amplifier $A_1$ outputs an H-voltage level signal when a threshold voltage level $V_{TH1}$ applied to one input terminal (+) is higher than a voltage level $V_{C3}$ applied to the other input terminal (−) and an L-voltage level signal when $V_{TH1}$ is equal to or lower than $V_{C3}$. The threshold voltage level $V_{TH1}$ is determined by two resistors $R_5$ and $R_6$. The voltage level $V_{C3}$ changes in accordance with a time constant determined substantially by $C_3$ and $R_3$ (because $R_4 << R_3$). Therefore, with reference to FIG. 8, when the power supply is turned on, the threshold voltage level $V_{TH1}$ rises immediately to a voltage level equal to $5V(R_6/R_5+R_6)$. However, the voltage level $V_{C3}$ rises gradually in accordance with a timer constant curve corresponding to the expression $T_3 = C_3 \cdot R_3 \approx 20$ msec ($T_3$ is approximately equal to 20 msec). As a result, the operational amplifier $A_1$ outputs a H-voltage level signal ($V_{OUT1}$) from the time the power supply is turned on until the voltage level $V_{C3}$ reaches the threshold level $V_{TH1}$ and an L-voltage level signal thereafter. Once the operational amplifier $A_1$ outputs an L-voltage level signal, the voltage level across the capacitor $C_3$ is discharged in accordance with the almost same time constant curve ($T_3 \approx C_3 \cdot R_3$) ($T_3$ is approximately equal to $C_3 \cdot R_3$). When this level reaches the second threshold voltage level $V_{TH1'}$, since the $V_{TH1}$ is higher than $JV_{TH1'}$, the operational amplifier $A_1$ outputs an H-voltage level signal ($V_{OUT1}$) again. The difference in voltage level between $V_{TH1}$ and $V_{TH1'}$ is a hysteresis voltage of the operational amplifier $A_1$. As described above, the oscillator 20 outputs a pulse signal with a period of about 20 msec determined by the first time constant ($T_3 \approx C_3 \cdot R_3$). Further, a resistor $R_4$ is provided to determine the voltage level of the output signal ($V_{OUT1}$) from the operational amplifier $A_1$. A resistor $R_7$ is provided to determine the feedback rate.

The third timer 22 also comprises an operational amplifier $A_2$ which serves as a comparator. The operational amplifier $A_2$ outputs an H-voltage level signal when a voltage level $V_{TH2}$ applied to one input terminal (+) is higher than the voltage $V_{C4}$ applied to the other input terminal (−) and an L-voltage level signal when $V_{TH2}$ is equal to or lower than $V_{C4}$. The threshold level $V_{TH2}$ is determined by two resistors $R_9$ and $R_{10}$. The voltage level $V_{C4}$ is determined in accordance with a time constant $T_4$ determined substantially by $C_4$ and $R_8$ which is shorter than that obtained by $T_3$. Therefore, with reference to FIG. 8, when the power supply is turned on, the threshold level $V_{TH2}$ rises immediately to a voltage level equal to $5V(R_1/R_9+R_{10})$. However, the voltage level $V_{C4}$ rises gradually in accordance with a time constant curve corresponding to the expression $T_4 \approx C_4 \cdot R_8$. As a result, the operational amplifier $A_2$ outputs an H-voltage level signal ($V_{OUT2}$) from the time the power supply is turned on until the voltage level $V_{C4}$ reaches the threshold level $V_{TH2}$ to initially reset the microprocessor 1 and an L-voltage level signal thereafter. Once the operational amplifier $A_2$ outputs an L-voltage level signal, since there exists no discharge route for the capacitor $C_3$, the operational amplifier $A_2$ keeps outputting an L-voltage level signal. As described above, the third timer 22 outputs an L-voltage level signal ($V_{OUT2}$) to initially reset the microprocessor 1. When the power supply is turned off the electric charge in the capacitor $C_4$ is discharged through an appropriate resistor (not shown) connected to the ground. A resistor $R_{12}$ is provided to determine the voltage level of the output signal ($V_{OUT2}$) from the operational amplifier $A_2$. A resistor $R_{11}$ is provided to determine the feedback rate.

The first and second NOR gates each output an L-voltage level signal when either of two input signals is at a H-voltage level and an H-voltage level signal when both the input signals are at an L-voltage level. As these NOR gates, it is possible to use HITACHI model HD 14001B gates, for instance.

Figure 8:
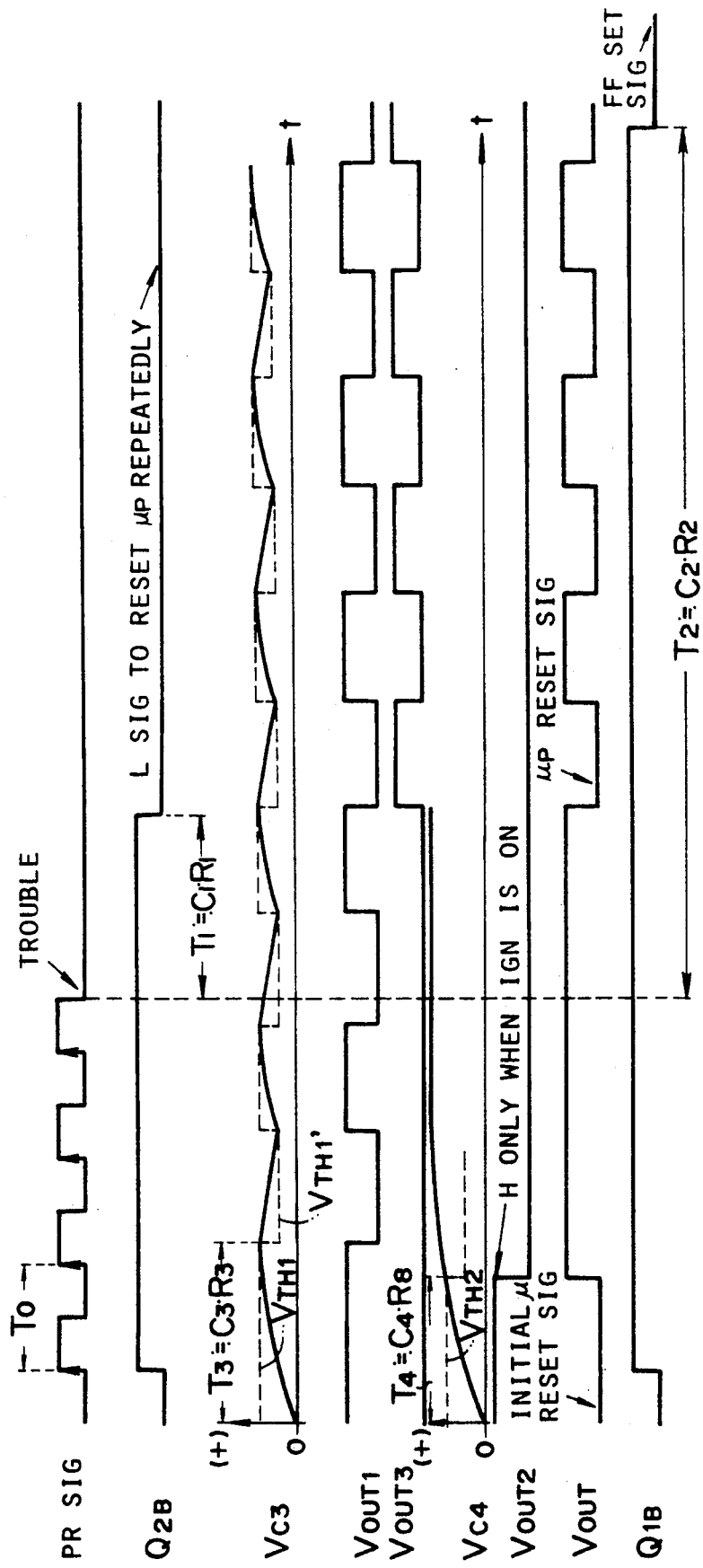
FIG. 8 is a timing chart for assistance in explaining the operation of the second embodiment of the monitoring apparatus for a control system provided with a microcomputer according to the present invention shown in FIG. 7.

The operation of the second embodiment according to the present invention will now be described with reference to FIGS. 7 and 8. When the power supply is turned on, since the threshold voltage level $V_{TH2}$ of the second operational amplifier $A_2$ is higher than the voltage level $V_{C4}$, the amplifier $A_2$ outputs an H-voltage level signal ($V_{OUT2}=H$). At this moment, since the microprocessor 1 does not yet output the PR signal (PR=L), the first timer 2 is kept reset and therefore outputs an L-voltage level signal ($Q_{2B}=L$). Similarly, since the threshold voltage level $V_{TH1}$ of the first operational amplifier $A_1$ is higher than the voltage level $V_{V3}$, the amplifier $A_1$ outputs an H-voltage level signal ($V_{OUT1}=H$). Since $Q_{2B}=L$ and $V_{OUT1}=H$, the first NOR gate outputs an L-voltage level signal ($V_{OUT3}=L$). As a result, since $V_{OUT3}=L$ and $V_{OUT2}=H$, the second NOR gate outputs an L-voltage level signal to initially reset the microprocessor 1. Therefore, since the processor 1 begins to output the PR signal, although the leading edge thereof triggers the first timer 2 to change the output to an H-voltage level ($Q_{2B}=H$), the first NOR gate remains at an L-voltage level ($V_{OUT3}=L$) because $V_{OUT1}=H$. After that, since the voltage $V_{C4}$ reaches the second threshold voltage level $V_{TH2}$, the second operational amplifier $A_2$ outputs an L-voltage level signal ($V_{OUT2}=L$). Since $V_{OUT3}=L$ and $V_{OUT2}=L$, the second NOR gate outputs an H-voltage level signal to release the resetting of the microprocessor 1, so that the microprocessor 1 begins to operate.

When the microprocessor 1 operates normally, since the PR signal with a constant period $T_o$ is applied to the first and second timers 2 and 4 (retriggerable monostable multivibrators), each timer is triggered repeatedly outputting an H-voltage level signal from both the output terminals $Q_{1B}$ and $Q_{2B}$. Therefore, since $Q_{2B}=H$, the first NOR gate outputs an L-voltage level signal ($V_{OUT3}=L$), irrespective of the voltage level $V_{OUT1}$. Since $V_{OUT3}=L$ and $V_{OUT3}=L$, the second NOR gate outputs an H-voltage level signal ($V_{OUT}=H$), without resetting the microprocessor 1. After that, since the voltage level $V_{C3}$ reaches the first threshold level $V_{TH1}$, the first operational amplifier $A_1$ begins to oscillate as described before, outputting a pulse signal with a period roughly determined by the expression $T_3 \approx C_3 \cdot R_3$.

If temporary trouble occurs in the microprocessor 1 and the PR signal stops oscillating, the second timer output $Q_{2B}$ drops to an L-voltage level the time ($T_1 \approx C_1 \cdot R_1$) after the PR signal stops. Since $Q_{2B}=L$ and $V_{OUT1}$ is oscillating, the first NOR gate outputs an H-voltage level signal ($V_{OUT3}$) only when $V_{OUT1}$ is at an L-voltage level. As a result, when $V_{OUT3}=L$ and $V_{OUT2}$ is H, the second NOR gate outputs an L-voltage level signal to reset the microprocessor 1. The microprocessor 1 is returned to the start step and if it starts executing the program control normally, the PR signal is outputted again to change the two output signals $Q_{1B}$ and $Q_{2B}$ to a H-voltage level again.

In contrast to the first embodiment shown in FIG. 4, in this second embodiment, the microprocessor 1 is repeatedly reset until returned to the normal operation, so that even if the resetting operation fails at first due to mixture of external noise or to fluctuations in the power supply, it is possible to more reliably reset the microprocessor to restore normal program control operation.

If the microprocessor 1 stops completely due to hardware trouble, the microprocessor 1 will not return to normal program control operation even if reset repeatedly. Therefore, the PR signal remains stopped. If the PR signal stops for longer than the time $T_2 \approx C_2 \cdot R_2$, the second timer 4 outputs an L-voltage level signal (trouble detection command signal) to the RS-FF 6 (shown in FIG. 4) to light up the alarm lamp 8 and/or to deenergize the electromagnetic solenoid 12 for disconnecting or disabling the actuator 10 of the control system.

As described above, in this second embodiment, only when the microprocessor 1 is not returned to normal operation in spite of the fact that the microprocessor 1 is reset repeatedly, does the monitoring apparatus output the trouble determination command signal for lighting up an alarm lamp and/or disabling an anti-skid control system to provide for fail-safe operation of the controlled system.

Although the foregoing description relates to a case where an anti-skid control system for an automotive vehicle is monitored by the apparatus according to the present invention, it is also possible to apply the monitoring apparatus according to the present invention to any control system including a microcomputer or microprocessor.

As described above, in the second embodiment according to the present invention, since the microprocessor can be reset repeatedly only when the program run pulse signal outputted in response to the normal program control execution stops oscillating for longer than a first predetermined time period and since a trouble detection command signal can be outputted only when the program run pulse signal does not begin to oscillate within a second predetermined time period after the microprocessor has first been reset, it is possible to return the microprocessor to normal program control operation in case of temporary microprocessor trouble due to, for instance, external noise, and additionally it is possible to generate an alarm signal and/or disable a control system including the microprocessor in response to the trouble detection command signal in case of nontemporary microprocessor trouble due to, for instance, hardware trouble, thus improving the reliability and safety of the control system including a microcomputer or a microprocessor.

It will be understood by those skilled in the art that the foregoing description is in terms of preferred embodiments of the present invention wherein various changes and modifications may be made without departing from the spirit and scope of the invention, as set forth in the appended claims.

What is claimed is:

1. A microcomputer monitoring apparatus, comprising:
   a microcomputer for storing a predetermined program and for executing said predetermined program,
   said microcomputer generating and outputting a cyclic signal, having a substantially cyclic oscillation period, indicating execution of said predetermined program,
   said microcomputer being resettable upon receipt of a reset signal for restarting said predetermined program and for generating said cyclic signal;
   first means for monitoring said cyclic signal and for outputting said reset signal for resetting said microcomputer upon an absence of said cyclic signal for a first predetermined period of time;
   second means for monitoring said cyclic signal and for outputting a warning signal upon an absence of said cyclic signal for a second predetermined period of time, said second predetermined period of time being longer than said first predetermined period of time so that said reset signal is input to said microcomputer at least once;
   third means, responsive to said warning signal for indicating occurrence of a type of error not correctable by resetting said microcomputer;
   oscillator means for generating a plurality of pulse signals starting at a third predetermined period of time after said microcomputer has been activated;
   constant level means for outputting a constant voltage level signal starting at a fourth predetermined period of time after said microcomputer has been activated, said fourth predetermined period of time being shorter than said third predetermined period of time;
   a first NOR gate having one input terminal connected to said first means, another input terminal connected to said oscillating means, and a NOR output for outputting a first NOR gate pulse signal when said first means outputs said reset signal and when said oscillator means is generating said pulse signals; and
   a second NOR gate having one input terminal connected to said NOR output of said first NOR gate and another input terminal connected to said constant level means, for outputting said reset signal to said microcomputer when said first NOR gate outputs said first NOR gate pulse signal and when said constant level means outputs said constant voltage level signal.

2. The monitoring apparatus as recited in claim 1, wherein said oscillator means comprises an operational amplifier, having one input terminal to which a threshold voltage level is applied and another input terminal to which a capacitor and resistor are connected, for outputting said pulse signal at said third predetermined period of time after said amplifier has been activated, said third predetermined period of time being determined in accordance with a time constant obtained by said capacitor and resistor.

* * * * *